US006636916B1

(12) United States Patent
Campbell et al.

(10) Patent No.: US 6,636,916 B1
(45) Date of Patent: Oct. 21, 2003

(54) ASSIGNING PCI DEVICE INTERRUPTS IN A COMPUTER SYSTEM

(75) Inventors: Robert G. Campbell, Cupertino, CA (US); Wesley H. Stelter, San Bruno, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/503,749

(22) Filed: Feb. 14, 2000

(51) Int. Cl.[7] .......................... G06F 13/24; G06F 13/26
(52) U.S. Cl. ...................... 710/266; 710/260; 710/261; 710/264
(58) Field of Search ............................... 710/260–266, 710/48; 711/217

(56) References Cited

U.S. PATENT DOCUMENTS

| 5,367,640 A | 11/1994 | Hamilton et al. ............ 395/275 |
| 5,619,703 A | 4/1997 | Omid et al. ................. 395/734 |
| 5,764,996 A | 6/1998 | Armstrong et al. ......... 395/733 |
| 5,878,237 A | 3/1999 | Olarig ......................... 395/308 |
| 5,881,294 A | 3/1999 | Downey et al. ............. 395/733 |
| 5,884,027 A | 3/1999 | Garbus et al. ........... 395/200.8 |
| 5,913,045 A | 6/1999 | Gillespie et al. ............ 395/309 |
| 5,944,831 A | 8/1999 | Pate et al. .................. 713/324 |
| 6,115,780 A | * 9/2000 | Furuta ........................ 710/266 |
| 6,192,439 B1 | * 2/2001 | Grunewald et al. ......... 710/260 |

OTHER PUBLICATIONS

"PCI IRQ Routing Table Specification" downloaded Jan. 19, 2000, from <http://agent.microsoft.com/hwdev/busbios/pci-irq.htm> (Dec. 1998).
"Smart IRQ" Hewlett Packard White Paper (Sep. 1998).

* cited by examiner

*Primary Examiner*—Rupal Dharia
*Assistant Examiner*—Trisha Vu

(57) ABSTRACT

A method and apparatus for assigning interrupts to devices on a PCI bus in a computer system in which a plurality of address lines are channeled through a multiplexer to a PCI device on the PCI bus. The multiplexer enables the user to dynamically select which address line is routed to the IDSEL pin on the PCI device. According to the PCI specification, the address line connected to the IDSEL pin determines the Device ID for that PCI device. In turn, the Device ID establishes which of the four available interrupt INT# lines are assigned to that PCI device. Thus, the interrupt INT# line assignments can be dynamically controlled. Where desired, the user can force two PCI devices to share an interrupt line, or the user can force the devices to use separate interrupts.

15 Claims, 3 Drawing Sheets

ASSIGNING PCI DEVICE INTERRUPTS IN A COMPUTER SYSTEM

BACKGROUND OF THE INVENTION

This invention relates to computer systems. More specifically, this invention relates to the assignment of interrupts to expansion cards on a computer.

The Peripheral Component Interconnect (PCI) bus is an industry standard system bus for connecting peripheral devices to the host processor bus. FIG. 1 shows an exemplary computer system 100 incorporating a conventional PCI bus. Computer system 100 includes a central processing unit (CPU) 102 connected through a host/PCI bridge 104 to main memory 106 and upstream PCI bus 108. Typically, the motherboard for computer system 100 is provided with a set of electrical card edge connector sockets, or "slots," each slot being adapted to receive a PCI card. Each PCI card, in turn, comprises at least one PCI device having a plurality of registers containing unique criteria such as Vendor ID, Device ID, Revision ID, Class Code Header Type, etc. The number of PCI cards that may be connected to a single PCI bus is limited, however, the PCI specification circumvents this limitation by allowing more than one PCI bus to exist in computer system 100.

FIG. 1 shows PCI bus 108 connected to PCI devices 110a–110c and to PCI-to-PCI bridge 114. PCI-TO-PCI bridge 114 provides a connection path between two independent buses, upstream PCI bus 108 and downstream PCI bus 116, and forwards all types of memory, I/O, and configuration commands between the interface to upstream PCI bus 108 and the interface to downstream PCI bus 116. Downstream bus 116, in turn, connects to PCI devices 110d–110g. Commonly used PCI devices include video cards, SCSI host adapters, and high-speed networking cards. PCI-TO-PCI bridge 114 may reside on a PCI interface card 116 having its own PCI bus 116 including PCI devices 110d–110g integrated on the card 116. Alternatively, PCI devices 110d–110g may be inserted into PCI bus connector slots provided on the downstream PCI bus 116. Each PCI device 110a–110f may contain one or more separate PCI functions (i.e., logical devices). A PCI device which contains only one function is referred to as a single-function device.

A more complete description of the PCI architecture can be found in "PCI System Architecture," Fourth Edition, MindShare, Inc., and "PCI/PCI Bridge Specification," revision 1.0, incorporated herein by reference.

At initial power-up, computer system 100 performs a Power On Self Test (POST) routine in which the configuration software in the computer scans the various buses in the system to determine what devices exist on the system and what configuration requirements they have. Each PCI device's configuration registers must be initialized at startup time to configure the device to respond to memory and I/O address ranges assigned to it by the configuration software. During the POST routine, the BIOS discovers each PCI device and the device's personal information, such as interrupt request number (IRQ#), bus master priority, latency time, and the like, are stored in the system is non-volatile random access memory (NVRAM). In addition, peripheral devices such as hard disks, CD-ROM readers, network interface cards, and video graphics controllers may be supplied by various hardware vendors. These hardware vendors must supply software drivers for their respective peripheral devices.

Various PCI interface control signals are used to control a PCI transfer. The Initialization Device Select (IDSEL) is an input to a PCI device and is used as a chip select during an access to one of the device's configuration registers. Normally for a device on a PCI bus, one of the upper AD lines in the range AD[31:16] are connected to the device's IDSEL pin. The PCI specification dictates which AD line is to be used for each available slot on a PCI bus, which ensures that no two devices on a particular bus are assigned to the same AD pin. Thus, in conventional computer systems, the IDSEL pin on each PCI device is hardwired to a pre-selected one of the sixteen available AD lines on the PCI bus.

FIG. 2 is a block diagram showing the connections of PCI devices 204–208 to PCI bus 200. AD lines 202 carry address and data information between PCI bus 200 and PCI devices 204–208. In the system shown in FIG. 2, address line AD16 210 is connected to the IDSEL input on PCI device 204, address line AD17 211 is connected to the IDSEL line of device 205, address line AD18 212 is connected to the IDSEL line of device 206, address line AD19 213 is connected to the IDSEL line of device 207, and address line AD20 214 is connected to the IDSEL line of device 208. Resistive coupling may be used to connect the address lines to the IDSEL lines.

The system BIOS maintains information regarding the hardwired routings of the AD lines to the IDSEL line of each of the target devices, as outlined by the PCI specification, and this routing information is used by the BIOS to determine the device number for each device on the bus. For example, because device 204 has its IDSEL pin connected to AD 16, device 204 acquires the system numbering of "device 0" on that bus. Accordingly, device 205 having its IDSEL connected to AD17 becomes "device 1" on that bus. This numbering system continues through AD31 (not shown in FIG. 2), which would be connected to the IDSEL of device 15. Because the AD lines are hardwired to the pins which mate with the devices' IDSEL lines, each device's device number is determined by its location on the bus and can normally only be changed by modifying that device's physical position on the bus, i.e., changing the slot into which the PCI card is inserted. Because embedded devices are not movable, the hardwired AD line connections cannot be modified.

Four PCI interrupt request lines (INTA#, FNTB#, INTC#, or INTD#) are available for PCI devices to generate interrupt requests in order to request servicing by the host processor. These four INT# lines are shares all of the PCI devices on the computer system. A multi-function PCI device, which takes the form of a physical package embodying between two and eight PCI functions, may implement up to all four of these interrupt pins. Each function within the package is permitted to use exactly one of these interrupt pins to generate requests, and that function's Interrupt Pin register is used to indicate which of the package's interrupt INT# pins is bonded to the function's internal INTA# pin.

As described above, the Device ID number for each PCI device is determined by the AD line number connected to that device's IDSEL pin. The Device ID, in turn, determines which of the input INT# lines on the bus is connected to the interrupt INTA# pin on the device. For devices on the motherboard, this INT# line assignment is flexible and can be determined by a mapping provided to the system BIOS. In a card which implements a PCI-to-PCI bridge and a secondary PCI bus (i.e., a bus that exists downstream of bus 0), the bridge specification dictates that the interrupt pins on the secondary bus's PCI functions must be connected to the add-in card's connector interrupt pins as indicated in Table I below.

TABLE I

| Ad Line | Device ID | Interrupt Assignment |
|---|---|---|
| AD16 | Device 0 | INTA# |
| AD17 | Device 1 | INTB# |
| AD18 | Device 2 | INTC# |
| AD19 | Device 3 | INTD# |
| AD20 | Device 4 | INTA# |
| AD21 | Device 5 | INTB# |
| AD22 | Device 6 | INTC# |
| AD23 | Device 7 | INTD# |
| AD24 | Device 8 | INTA# |
| AD25 | Device 9 | INTB# |
| AD26 | Device 10 | INTC# |
| AD27 | Device 11 | INTD# |
| AD28 | Device 12 | INTA# |
| AD29 | Device 13 | INTB# |
| AD30 | Device 14 | INTC# |
| AD31 | Device 15 | INTD# |

As can be seen from Table I, the INTA# pin on device 0 is connected to the INTA# line on the bridge's card. However, the INTA# pin on device 1 is connected with the INTB# line the bridge's card, the INTA# pin on device 2 is connected with the INTC# line the bridge's card, and the INTA# pin on device 3 is connected with the INTD# line the bridge's card. Each device uses its INTA# pin to send interrupts to the host processor, while the processor uses different INT# lines to communicate with the INTA# pins on the individual devices on the bus. In a computer system having only four devices located on a bus, this staggered connection arrangement advantageously results in an efficient sharing of the four available interrupt INT# lines by providing each device with its own unique interrupt INT# line.

If a fifth device (device 4 in Table I above) is added to the bus, then that device's INTA# pin is connected to the INTA# pin the bridge's card. Because there are only four available interrupt lines, this arrangement forces device 0 and device 4 to share the INTA# interrupt line. Although the PCI specification was designed to anticipate this interrupt sharing, problems often arise. In some cases, the device driver may be poorly written or not fully PCI-compliant, which could result in poor sharing of interrupts and other compatibility problems. Even if the interrupt sharing is successful, because the interrupt handler must search through all the devices assigned to that interrupt in order to determine the proper device, many I/O cycles are wasted, causing performance to suffer. Accordingly, there is a need for an improved method of assigning shared interrupts to PCI devices.

SUMMARY OF THE INVENTION

In accordance with the present invention, a method for assigning PCI device interrupts performed by a computer system having a PCI bus comprises selecting a first assigned address line from a first plurality of address lines, said first plurality of address lines being connected through a multiplexer to a first IDSEL input on a first PCI device on said PCI bus, and controlling said multiplexer to channel a signal from said first assigned address line to said first IDSEL input on said first PCI device.

In accordance with another aspect of the present invention, the method further comprises selecting a second assigned address line from a second plurality of address lines, said second plurality of address lines being connected through a second multiplexer to a second IDSEL input on a second PCI device on said PCI bus, and controlling said multiplexer to channel a signal from said second assigned address line to said second IDSEL input on said second PCI device.

In accordance with yet another aspect of the present invention, a computer system comprises a PCI bus, a plurality of interrupt lines on said PCI bus, a first plurality of address lines on said PCI bus, a first multiplexer connected to a second plurality of address lines, said second plurality of address lines being a subset of said first plurality of address lines, a first PCI device on said PCI bus having a first IDSEL pin connected to said first multiplexer, and a first control line to said first multiplexer, said first control line providing a control signal to said first multiplexer to channel a first assigned address line in said second plurality of address lines to said first IDSEL pin.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

Figure 1:
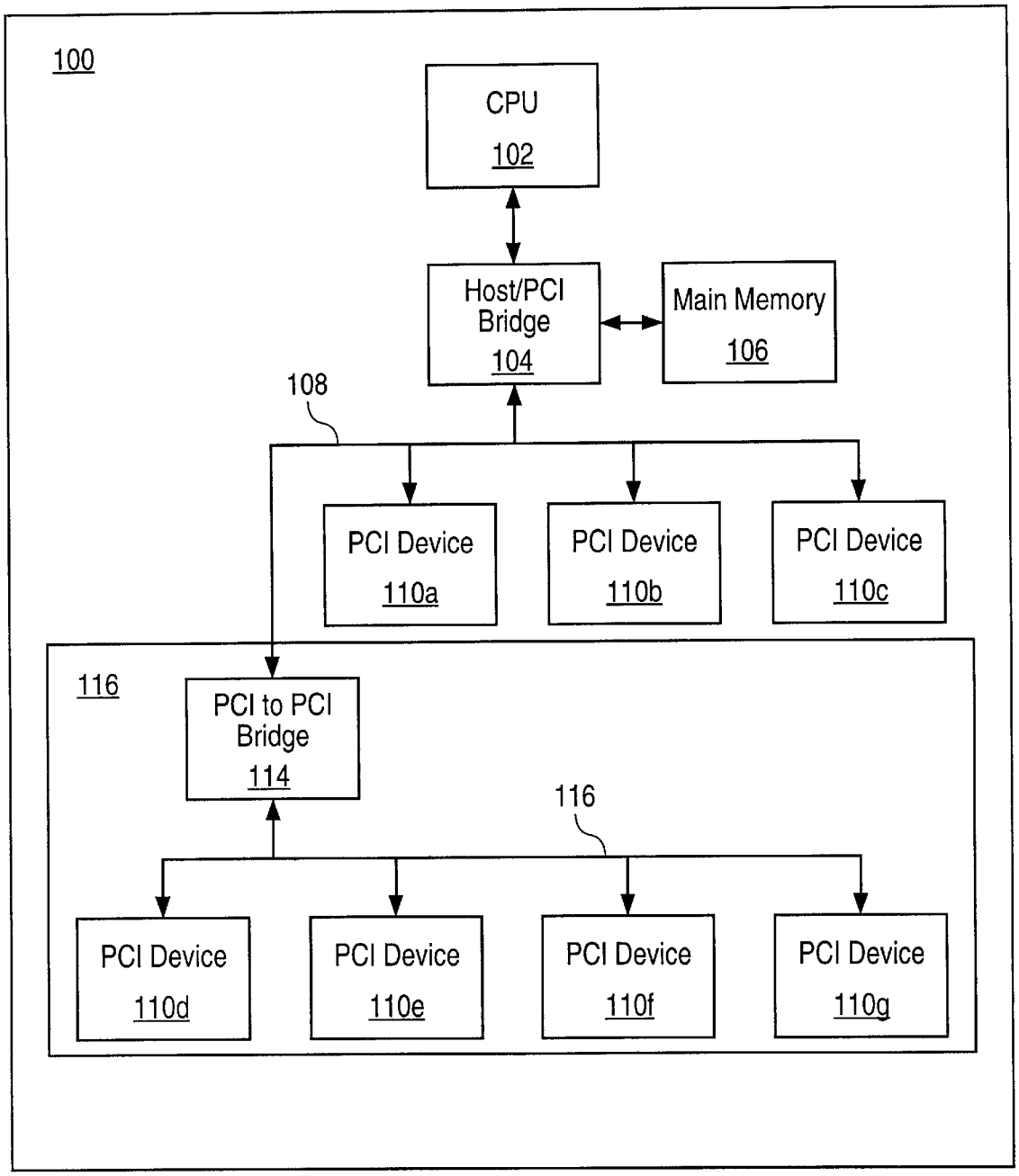
FIG. 1 is a block diagram of a computer system implementing a PCI-to-PCI bridge.
Figure 2:
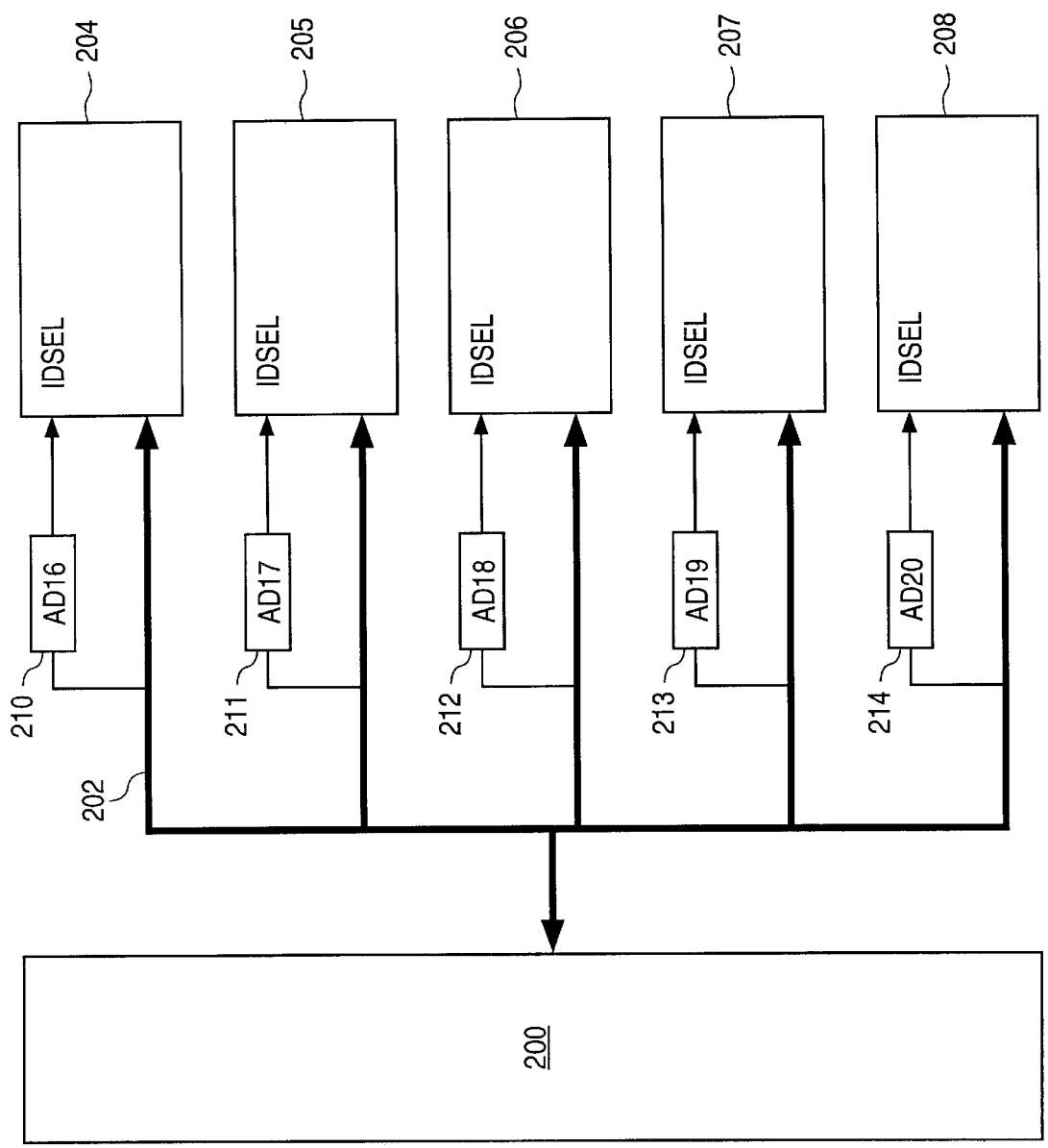
FIG. 2 is a block diagram of a prior art address line routing.
Figure 3:
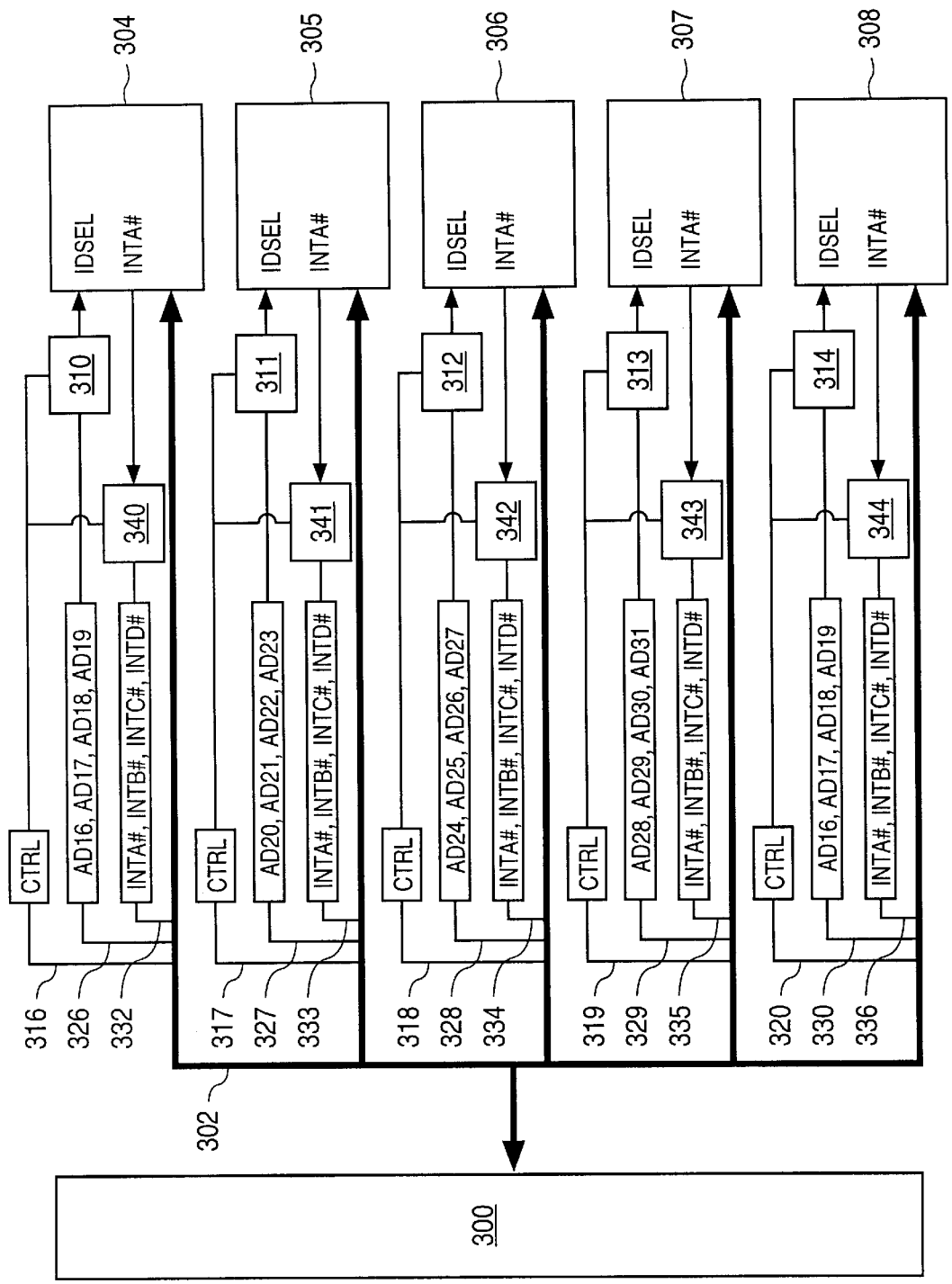
FIG. 3 is a block diagram of a computer system in accordance with an embodiment of the present invention.

FIG. 3 is a block diagram illustrating a portion of a computer system incorporating an embodiment of the present invention. PCI bus 300 is, for example, a bus existing on a PCI-to-PCI bridge card having five PCI devices 304–308 mounted thereon. Data lines 302 transmit address and data information to and from PCI bus 300 to PCI devices 304–308. In contrast with conventional methods of hard-wiring a single AD line to each PCI device 304–308, a plurality of AD lines are channeled into a multiplexer ("MUX"), which feeds one of the AD lines to the IDSEL pin on the target PCI device.

In FIG. 3, a first set of AD lines 326, including AD16, AD17, AD18, and AD19, are channeled into MUX 310. In addition, control line ("CTRL") 316 provides a control data signal to MUX 310. It will be understood that in order for MUX 310 to select between more than two AD lines, control line 316 may be formed of a plurality of control lines. Similarly, CTRL 317 and a second set of AD lines 327 (including AD20, AD21, AD22, and AD23) feed into MUX 311; CTRL 318 and a third set of AD lines 328 (including AD24, AD25, AD26, and AD27) feed into MUX 312; and CTRL 319 and a fourth set of AD lines 329 (including AD28, AD29, AD30, and AD31) feed into MUX 313. After AD31, the use of address lines begins at AD16 again, so CTRL 320 and a fifth set of AD lines 330 (including AD16, AD17, AD18, and AD19) feed into MUX 314.

In addition to AD lines 326, a first set of incoming INT# lines 332, including INTA#, INTB#, INTC#, and INTD#, are connected through demultiplexer 340, which channels these lines to the INTA# pin on device 304. Sets of incoming INT# lines 333–336 also are connected through demultiplexers 341–344, which then channels these lines 333–336 into the internal INTA# pins on devices 305–308. CTRL lines 316–320 also provide control signals to demultiplexers 340–344.

The operation is as follows. Traditionally, PCI-to-PCI bridges are not involved in interrupt routing; the bridges simply pass the bus cycles back and forth between the upstream bus and the downstream bus. However, in the present embodiment, the PCI-to-PCI bridge is provided with additional logic, multiplexers 310–314, which can be used to control the Device ID assigned to each PCI device 304–308. This Device ID assignment ultimately dictates the interrupts which are assigned to each device. The IDSEL for each PCI device is connected through a MUX to a plurality of address lines, each address line being associated with a unique INT# interrupt line. For example, as discussed above, a device having its IDSEL pin connected with the AD 16 line would be identified by the bus as "device 0." According to PCI specifications, as outlined in Table I, device 0 should properly be connected with the INTA# pin on PCI bus 300. Thus, if multiplexer 310 channels address line AD16 to the IDSEL pin on PCI device 304, device 304 will adopt the designation as "device 0," and, accordingly, should have its INTA# pin connected with the INTA# input from PCI bus 300.

MUX 311 has the option of channeling one of either AD20, AD21, AD22, and AD23 into the IDSEL pin for device 305. By careful selection of these four AD lines, the Device ID for device 305 can be determined such that device 305 can be used with any of the four available interrupt INT# lines from PCI bus 300. Each of the remaining devices 306–308 similarly are connected with a sufficient number of AD lines such that their Device IDs can be actively selected by the user. While both device 304 and device 308 are connected to the same collection of AD lines (AD 16, AD 17, AD 18, and AD 19), the two devices will ultimately have their IDSEL pins connected through multiplexers 310 and 314 to different AD lines, thus avoiding any conflicts. In one embodiment, the BIOS of the computer may be modified to include set-up screens to enable the user to choose the AD line routing during boot-up time. This arrangement enables the user to dynamically choose the configuration space for each device 304–308, which then determines the interrupt INT# assignments.

The interrupt assignments chosen by the user may depend upon the type and usage of the devices 304–308 on bus 300. In one embodiment, devices 304–308 all perform identical or similar functions using the same device driver. Because the same device driver is used for each device, it is more likely that the device driver will cause unexpected interrupt conflicts when two devices both attempt to use the same interrupt INT# line. In addition, identical devices sharing the same device driver make better use of shared data structures and memory registers. Because of the decreased chance for error, the user may designate that multiple devices be assigned to the INTA# line. Another reason for assigning the same interrupt line to multiple devices would be if the user anticipates that the devices would rarely be utilized concurrently with each other, such as, for example, when they all perform similar network functions.

The forced sharing of the same interrupt INT# line can be accomplished by sending a control signal along control line 316 to MUX 310, instructing MUX 310 to route address line AD16 to the IDSEL pin on device 304. Similar signals are sent to control line 317, instructing MUX 311 to route address line AD20 to the IDSEL pin on device 305, control line 318, instructing MUX 312 to route address line AD24 to the IDSEL pin on device 306, and control line 319, instructing MUX 313 to route address line AD28 to the IDSEL pin on device 307. This results in devices 304, 305, 306, and 307 being assigned the device numbers 0, 4, 8, and 12, respectively. Following interrupt assignments outlined in Table I, multiplexers 310–313 will connect the internal INTA# pin on all devices 304–307 to the INTA# lines from bus 300, thus forcing devices 304–307 to share the same interrupt. The interrupt assignments are stored into non-volatile memory during boot-up to enable the computer system to quickly access these devices whenever an interrupt is requested.

In another example, devices 304 and 305 perform network functions, while devices 306, 307, and 308 perform SCSI functions. One interrupt assignment scheme may involve forcing devices 304 and 305 to share one interrupt INT# line, while forcing devices 306, 307, and 308 to share a different interrupt INT# line. This may be performed by routing the AD16 address line to the IDSEL pin on device 304, the AD20 address line to the IDSEL pin on device 305, the AD25 address line to the IDSEL pin on device 306, the AD29 address line to the IDSEL pin on device 307, and the AD17 address line to the IDSEL pin on device 308. This assigns device numbers 0, 4, 9, 13, and I to devices 304, 305, 306, 307, and 308, respectively. In this example, similar functions (devices 304 and 305) are assigned the same interrupt (INTA#), and different functions (devices 306, 307, and 308) are forced onto a different interrupt line (INTB#).

As illustrated by the above examples, the user is provided with the capability of dynamically selecting the interrupt lines used for devices on a particular PCI bus. This can be particularly advantageous in a computer system having multiple PCI devices performing similar or concurrent I/O tasks. A conventional mid-range computer system may be provided with a bus having eight I/O slots, each slot including four or five embedded PCI devices. With only four interrupt INT# lines available, the potential for interrupt conflicts is significant. By enabling the user to actively select the interrupt assignments based on the anticipated use of the devices instead of simply accepting hardwired default assignments, the potential for conflicts can be reduced.

Multiplexers 310–314 and demultiplexers 340–344 can be integrated as part of a PCI-to-PCI bridge, and in such a case may be in the form of a single additional logic chip on the bridge's circuit board. However, in other embodiments, multiplexers 310–314 and demultiplexers 340–344 may be located anywhere in the computer system. Control lines 316–320 may take any form and, as described above, may require multiple lines depending on the number of address and interrupt lines they control. Many PCI devices include general purpose control pins which could be used to generate control signals on control lines 316–320.

As described above, in one embodiment, the I/O interrupt assignments are selected by the user at boot time during the POST routine. In another embodiment of the present invention, the interrupt assignments are performed in conjunction with a computer system implementing the Advanced Configuration and Power Interface (ACPI) specification. The ACPI specification is an open industry specification which defines a flexible interface enabling and supporting power management and system configuration through improved hardware and operating system coordination. This specification enables dynamic control of peripheral devices, such as, for example, by allowing devices to be added to the computer system while the computer is running ("hot plugging"). ACPI services can be used to enable reconfiguration of the devices on the PCI bus during use, after the POST routine has been completed. Such an application would be advantageous in a situation where a new PCI device is "hot plugged," and the user wishes to re-assign the interrupts to the devices on that bus in order to reduce the conflicts that might be caused by the new device.

Although the invention has been described with reference to particular embodiments, the description is only an example of the invention's application and should not be taken as a limitation. In particular, even though much of preceding discussion was directed to devices embedded on a PCI-to-PCI bridge card, the method of re-assigning I/O interrupts in accordance with the present invention may be performed using any type of computer bus. Various other adaptations and combinations of features of the embodiments disclosed are within the scope of the invention as defined by the following claims.

We claim:

1. A method for assigning PCI device interrupts performed by a computer system having a PCI bus, comprising:
   selecting a first assigned address line from a first set of address lines, said first set of address lines being connected through a multiplexer to a first IDSEL input on a first PCI device on said PCI bus, said first set of address lines comprising more than one address line and being a subset of a plurality of address lines; and
   controlling said multiplexer to channel a signal from said first assigned address line to said first IDSEL input on said first PCI device.

2. The method of claim 1, wherein:
   said controlling said multiplexer further comprises transmitting a control signal to said multiplexer indicating that said first assigned address line is to be channeled to said first IDSEL input on said first PCI device.

3. The method of claim 1, further comprising:
   selecting a second assigned address line from a second set of address lines, said second set of address lines being connected through a second multiplexer to a second IDSEL input on a second PCI device on said PCI bus, said second set of address lines being a subset of said plurality of address lines; and
   controlling said second multiplexer to channel a second signal from said second assigned address line to said second IDSEL input on said second PCI device.

4. The method of claim 3, wherein:
   said first assigned address line corresponds to a first interrupt signal; and
   said second assigned address line corresponds to said first interrupt signal.

5. The method of claim 3, wherein:
   said first assigned address line corresponds to a first interrupt signal; and
   said second assigned address line corresponds to a second interrupt signal.

6. The method of claim 1, further comprising:
   querying a user regarding a desired interrupt signal; wherein said selecting said first assigned address line comprises selecting said first assigned address line to correspond to said desired interrupt signal.

7. A method for assigning interrupts to peripheral components performed by a computer system having a PCI bus with a first plurality of address lines, comprising:
   selecting a first assigned address line from a second plurality of address lines connected to a first IDSEL input on a first PCI device on said PCI bus, said second plurality of address lines being a subset of said first plurality of address lines;
   channeling said first assigned address line to said first IDSEL input on said first PCI device.

8. The method of claim 7, wherein said channeling said first assigned address line to said first IDSEL input comprises controlling a multiplexer which channels said first assigned address line to said first IDSEL.

9. The method of claim 8, further comprising transmitting a control signal to said multiplexer indicating that said first assigned address line is to be channeled to said first IDSEL input.

10. The method of claim 7, further comprising:
    selecting a second assigned address line form a third plurality of address lines connected to a second IDSEL input on a second PCI device on said PCI bus, said third plurality of address lines being a subset of said first plurality of address lines;
    channeling said second assigned address line to said second IDSEL input.

11. The method of claim 10, wherein said channeling said second assigned address line to said second IDSEL input comprises controlling a second multiplexer which channels said second assigned address line to said second IDSEL.

12. The method of claim 11, further comprising transmitting a control signal to said second multiplexer indicating that said second assigned address line is to be channeled to said second IDSEL input.

13. The method of claim 11, further comprising:
    querying a user whether an interrupt is to be shared between said first PCI device and said second PCI device; if said user requests that the interrupt be shared, then said selecting said second assigned address line from said third plurality of address lines comprises selling said second assigned address line to correspond with a first interrupt pin, said first interrupt pin also corresponding to said first assigned address line channeled to said first IDSEL input; and
    if said user requests that the interrupt not be shared, then said selecting said second address line from said third plurality of address lines comprises selecting said second assigned address line from said third plurality of address lines comprises selecting said second assigned address line to correspond with a second interrupt pin, said second interrupt pin being distinct from said first interrupt pin corresponding to said first assigned address line channeled to said first IDSEL input.

14. A computer system, comprising:
    a PCI bus;
    a plurality of interrupt lines on said PCI bus;
    a first plurality of address lines on said PCI bus;
    a first multiplexer connected to a second plurality of address lines, said second plurality of address lines being a subset of said first plurality of address lines;
    a first PCI device on said PCI bus having a first IDSEL pin connected to said first multiplexer; and
    a first control line to said first multiplexer, said first control line providing a control signal to said first multiplexer to channel a first assigned address line in said second plurality of address lines to said first IDSEL pin.

15. The computer system of claim 14, further comprising:
    a second multiplexer connected to a third plurality of address lines, said third plurality of address lines being a subset of said fist plurality of address lines; a second PCI device on said PCI bus having a second IDSEL pin connected to said second multiplexer; and
    a second control line to said second multiplexer, said second control line providing a control signal to said second multiplexer to cannel a second assigned address line in said third plurality of address lines to said second IDSEL pin.

* * * * *